(12) United States Patent
Breuer et al.

(10) Patent No.: US 9,566,959 B2
(45) Date of Patent: Feb. 14, 2017

(54) METHOD FOR DETERMINING AN EMERGENCY BRAKING SITUATION OF A VEHICLE

(71) Applicant: WABCO GmbH, Hannover (DE)

(72) Inventors: Karsten Breuer, Lauenau (DE); Dirk Sandkuhler, Bad Sassendorf (DE)

(73) Assignee: WABCO GMBH, Hannover (DE)

( * ) Notice: Subject to any disclaimer, the term of this patent is extended or adjusted under 35 U.S.C. 154(b) by 0 days.

(21) Appl. No.: 14/376,727

(22) PCT Filed: Feb. 1, 2013

(86) PCT No.: PCT/EP2013/000305
§ 371 (c)(1),
(2) Date: Aug. 5, 2014

(87) PCT Pub. No.: WO2013/064705
PCT Pub. Date: May 10, 2013

(65) Prior Publication Data
US 2015/0012204 A1    Jan. 8, 2015

(30) Foreign Application Priority Data
Feb. 14, 2012    (DE) .......................... 10 2012 002 695

(51) Int. Cl.
*B60T 7/12*    (2006.01)
*B60T 7/22*    (2006.01)
(Continued)

(52) U.S. Cl.
CPC .............. *B60T 7/22* (2013.01); *B60R 21/0134* (2013.01); *G08G 1/161* (2013.01); *G08G 1/166* (2013.01);
(Continued)

(58) Field of Classification Search
CPC combination set(s) only.
See application file for complete search history.

(56) References Cited

U.S. PATENT DOCUMENTS 4,833,469 A * 5/1989 David ................ B60K 31/0008
                                                  180/169
5,332,057 A * 7/1994 Butsuen ............ B60K 31/0008
                                                  180/169
(Continued)

FOREIGN PATENT DOCUMENTS

DE         102 58 617 B4    4/2004
DE    10 2006 019 848 B4    5/2007
(Continued)

*Primary Examiner* — Jonathan L Sample
(74) *Attorney, Agent, or Firm* — Leydig, Voit & Mayer, Ltd

(57) ABSTRACT

To determine whether an emergency braking situation exists for a vehicle, the vehicle determines at least the following state variables: its own velocity, its own longitudinal acceleration, its relative distance from an object in front, and the speed and acceleration of the object in front. A suitable evaluation method to assess whether an emergency braking situation is present is determined as a function of these state variables from a plurality of evaluation method options, including at least a movement equation evaluation method in which a movement equation system of the vehicle and of the object in front is determined, and an evaluation method in which a braking distance of the vehicle is determined.

14 Claims, 6 Drawing Sheets

(51) Int. Cl.
*G08G 1/16* (2006.01)
*B60R 21/0134* (2006.01)
*B60K 31/00* (2006.01)
*B60W 10/18* (2012.01)
*B60W 30/09* (2012.01)

(52) U.S. Cl.
CPC ....... *B60K 2031/0033* (2013.01); *B60W 10/18* (2013.01); *B60W 30/09* (2013.01); *B60W 2520/10* (2013.01); *B60W 2520/105* (2013.01); *B60W 2550/302* (2013.01); *B60W 2550/308* (2013.01)

(56) References Cited

U.S. PATENT DOCUMENTS

| | | | | |
|---|---|---|---|---|
| 5,530,651 A * | 6/1996 | Uemura | ................... | B60T 7/22 180/169 |
| 5,540,298 A * | 7/1996 | Yoshioka | ........... | B60G 17/0195 180/169 |
| 5,983,161 A * | 11/1999 | Lemelson | ............... | G01S 19/11 340/436 |
| 6,147,600 A * | 11/2000 | Faye | .................. | B60K 31/0008 340/463 |
| 6,488,109 B1 * | 12/2002 | Igaki | .................. | B60T 8/17557 180/169 |
| 2001/0003810 A1 * | 6/2001 | Shinmura | ................. | B60T 7/22 701/301 |
| 2002/0107629 A1 * | 8/2002 | Maruko | ............. | B60K 31/0008 701/93 |
| 2003/0191568 A1 * | 10/2003 | Breed | ................... | B60W 40/06 701/36 |
| 2004/0078133 A1 * | 4/2004 | Miller | ................ | B60K 31/0008 701/96 |
| 2004/0088097 A1 * | 5/2004 | Fujinami | ................. | B60T 7/22 701/70 |
| 2004/0122573 A1 * | 6/2004 | Mizutani | ................... | B60T 7/22 701/45 |
| 2004/0155811 A1 * | 8/2004 | Albero | ............... | B60K 31/0008 342/70 |
| 2005/0060069 A1 * | 3/2005 | Breed | ................... | B60N 2/2863 701/408 |
| 2005/0137786 A1 * | 6/2005 | Breed | ................... | B60N 2/2863 701/482 |
| 2006/0195231 A1 * | 8/2006 | Diebold | ................ | B60R 21/013 701/1 |
| 2007/0112514 A1 * | 5/2007 | Ekmark | ................. | G08G 1/161 701/301 |
| 2008/0275618 A1 * | 11/2008 | Grimm | .................. | G08G 1/162 701/96 |
| 2008/0319610 A1 * | 12/2008 | Oechsle | ............. | B60R 21/0134 701/41 |
| 2009/0012684 A1 * | 1/2009 | Thiele | ....................... | B60T 7/22 701/70 |
| 2009/0143951 A1 * | 6/2009 | Takahashi | ............. | B60W 30/02 701/70 |
| 2009/0192710 A1 * | 7/2009 | Eidehall | .................. | B62D 15/0265 701/301 |
| 2010/0007728 A1 * | 1/2010 | Strauss | ............... | B60R 21/0134 348/118 |
| 2010/0312434 A1 * | 12/2010 | Schutyser | ............. | B60W 10/18 701/42 |
| 2011/0010094 A1 * | 1/2011 | Simon | ................... | B60W 30/16 701/301 |
| 2011/0106381 A1 * | 5/2011 | Filev | ...................... | B62D 6/007 701/40 |
| 2011/0115615 A1 * | 5/2011 | Luo | .......................... | B60R 1/00 340/436 |
| 2011/0187520 A1 * | 8/2011 | Filev | ...................... | B60W 50/16 340/438 |
| 2011/0190972 A1 * | 8/2011 | Timmons | ............... | G01C 21/34 701/31.4 |
| 2012/0016573 A1 * | 1/2012 | Ellis | ................... | B60K 31/0008 701/112 |
| 2012/0025969 A1 * | 2/2012 | Dozza | ..................... | B60Q 1/44 340/463 |
| 2015/0298679 A1 * | 10/2015 | Sugitani | ................... | B60K 6/48 701/22 |
| 2015/0353062 A1 * | 12/2015 | Breuer | ..................... | B60T 7/22 701/70 |

FOREIGN PATENT DOCUMENTS

| | | |
|---|---|---|
| DE | 10 2008 045 481 A1 | 5/2009 |
| DE | 10 2007 060 862 A1 | 7/2009 |
| DE | 10 2010 027 449 A1 | 1/2012 |
| DE | 10 2010 051 203 A1 | 5/2012 |
| EP | 0 891 903 A2 | 1/1999 |
| EP | 1 539 523 B1 | 6/2005 |
| EP | 1625979 | 2/2006 |
| EP | 1 803 109 | 7/2007 |
| JP | 2004038245 A | 2/2004 |
| WO | WO 2009/072965 A1 | 6/2009 |

* cited by examiner

METHOD FOR DETERMINING AN EMERGENCY BRAKING SITUATION OF A VEHICLE

FIELD OF THE INVENTION

The present invention generally relates to a method for determining an emergency braking situation of a vehicle (e.g., risk of a rear impact), a control device for carrying out the method and a driving dynamics control system equipped with the control device.

BACKGROUND OF THE INVENTION

It is generally known to establish equations of motion in order to determine a collision time for the current driving behavior of a vehicle and of a vehicle ahead. It is also generally known to determine target decelerations in order to avoid possible collisions.

EP 1 539 523 B1 and DE10258617B4 disclose a method and a device for triggering an automatic emergency braking process of a vehicle. The speed and the acceleration of the subject vehicle are determined and a minimum distance is set as a target safety distance. Furthermore, a target relative speed between the two vehicles is set that should be reached at the end of the automatic emergency braking process. In addition, the determined currently existing relative acceleration between the two vehicles is used.

DE 10 2006 019 848 B4 discloses a device for reducing the effects of a vehicle collision in which an obstruction is detected with its relative distance and its relative speed and a possible collision or accident is assessed, whereupon an occupant protection device may be activated. Such systems are also known as pre-crash systems.

JP 2004038245 A1 discloses an obstruction detector for vehicles with which a detected steering wheel operation is additionally used. EP 0 891 903 B1 discloses an automatic emergency brake function that assesses the possibility of avoiding an obstruction. EP 1 625 979 B1 discloses a method and a device for triggering emergency braking with which a probability of collision and furthermore a risk to the subject vehicle in the case of triggering of emergency braking are determined and the triggering threshold for the emergency braking can be varied depending on the determined risk. EP 1 803 109 B1 discloses a method for determining relevant objects close to a vehicle by which collision-relevant values are calculated from vehicle data and/or environmental sensor data including possible evasive maneuvers or braking processes.

Such conventional methods have the disadvantage that, in general, they are often restricted to only special driving situations and thus do not always contribute in a timely manner to avoiding accidents by autonomous braking. Furthermore, triggering of emergency braking may also take place too early and thus possibly unnecessarily.

Furthermore, various cruise control systems without emergency braking are known. For example, the Bendix-Wingman ACB adaptive cruise system with a braking property comprises a distance maintaining method for maintaining the distance to a vehicle ahead constant. Warning display signals and also emergency braking signals can be output for automatically carrying out an emergency braking process. For this purpose the distance to the vehicle ahead is measured, e.g., with radar.

SUMMARY OF THE INVENTION

Generally speaking, it is an object of the present invention to provide a method, a corresponding control device to carry it out, and a driving dynamics control system, that enable reliable recognition of an emergency braking situation and keep the likelihood of unwarranted emergency braking low.

Various methods for assessing whether an emergency braking situation is presented can be used based on the currently prevailing driving situation.

According to a first assessment method, which constitutes an equation of motion assessment method, equations of motion of both a subject vehicle and also an object ahead of the vehicle are established and an assessment is made depending on the equations of motion as to whether an emergency braking situation exists. Depending on the assessment, a required deceleration can be calculated. The equations of motion can be established in the second order of time, i.e., with an initial value, a linear term and a quadratic term, so that a common system of equations or a common equation of motion of the subject vehicle and the object ahead can be formed, from which a subsequent distance less than a minimum distance and/or a collision can be determined.

According to a second assessment method, a braking distance observation is carried out, in which the braking distance at least of the subject vehicle is determined and can be assessed.

In a typical driving situation of a subject vehicle behind an object ahead, an emergency braking situation can be determined using equations of motion of the subject vehicle and of the object ahead. For such an equation of motion assessment method, second order equations of motion in the time domain can be formed, i.e., with a relative distance as a zero order term in the time domain, the speeds (or the relative speed) as first order terms in the time domain, and the accelerations as second order terms in the time domain. From these equations of motion, a system of equations can thus be formed, by which it can be determined whether an approach to an admissible minimum distance will occur (e.g., a minimum distance of 1 meter or even zero). In addition, response times of the brake systems of the vehicle (e.g., for supplying air to the brakes) and/or of the driver can be included, because changes through active interventions only take effect after the response time.

A system of equations approach, especially using second order equations of motion in the time domain, can cause miscalculations in some situations. Second order equations of motion in the time domain with negative acceleration, i.e., braking or deceleration of the subject vehicle or of the object ahead, also mathematically include imaginary reversing following a completely stationary state of the vehicle or of the object. Such imaginary reversing is, however, physically meaningless, because a deceleration of a vehicle by means of a braking intervention or an engine retarding intervention (or even e.g., air friction) can indeed cause braking (negative acceleration) from a positive speed to the stationary state, but no further rearward acceleration of a stationary vehicle can be caused. Rather, with the vehicle stationary, the physically effective braking effect, i.e., the negative acceleration, decreases to zero, i.e., the vehicle comes to rest but reversing does not commence.

Imaginary but meaningless collisions that occur during reversing, especially in the case of imaginary reversing of the object driving ahead, can thus be determined in the mathematical system of equations.

Therefore, according to embodiments of the present invention, the equation of motion assessment method is only used if it is determined to be useful. Advantageously, criteria for determining different situations are used in order to select the suitable assessment method.

If it is determined that the first assessment method, i.e., the equation of motion assessment method, is not useful, another assessment method is used, wherein at least one is provided as a second assessment method, preferably a braking distance assessment method with a braking distance observation. A braking distance of the subject vehicle is determined and assessed, preferably without involving the accurate equations of motion of the subject vehicle and of the object ahead. Preferably, a time-dependent admissibility criterion is defined, which compares the subject braking time of the first subject vehicle with the object braking time of the second object ahead, which constitutes a particularly simple determination and specification of the admissibility of the first or second assessment method. The subject braking time until reaching the minimum distance, while at the same time fully reducing the relative speed of the first subject vehicle to the second object ahead, can thereby be determined in advance. The object braking time is the time that the second object ahead requires to come to rest.

According to an embodiment of the present invention, an advance criterion can be used regarding whether the relative distance has not already reached or fallen below the minimum distance following the response time, and thus an emergency braking situation already exists. This can be considered to be an advance ("zeroth") assessment method, so that the first and second methods do not even become relevant.

The subject first acceleration can be measured by means of a longitudinal acceleration sensor and/or can be determined by time differentiation of the subject first speed. The relative distance to the object ahead can be determined by means of a distance sensor. From this, the second speed of the object can thus be determined from the time variation of the signal of the relative distance and its second acceleration can be determined as a time derivative thereof. However, in principle, the second speed of the object can also be recorded e.g., by means of a radar Doppler measurement. The assessment of the emergency braking situation can be determined by determining the required deceleration of the subject vehicle.

In a distance-time diagram, the second order equations of motion in the time domain produce parabolas; for a negative acceleration, i.e., braking or deceleration, the parabolas are open at the bottom. The corresponding speed profiles form straight lines, which thus have a negative gradient for braking.

The decreasing branches of a parabolic motion graph in the distance-time diagram and corresponding negative values in the speed-time diagram are assessed as physically meaningless. Such states, which result in a false assessment, are excluded by means of suitable criteria.

The imaginary case can thus be excluded in which during negative acceleration, i.e., deceleration or braking, the vehicle ahead causes a collision with the subject vehicle in a subsequent imaginary reversing movement after being at rest.

In order to exclude this case of imaginary reversing that would produce a collision, a check is made as to what times or what braking distances the object and the subject vehicle require to come to rest. If the subject vehicle comes to rest earlier than or at the same time as the object ahead, according to one embodiment, the first assessment method can be applied advantageously. If the subject vehicle comes to rest later than the object ahead, however, the equation of motion assessment method is advantageously not applied because an imaginary collision case for subsequent reversing of the object ahead is determined. An admissibility criterion for the equation of motion assessment method is thus provided, wherein the second assessment method is consequently used if it is not fulfilled.

With the second assessment method, in principle, the braking distances until coming to rest are used, but not the dynamics of the vehicle, i.e., its accurate equations of motion. Thus, theoretically, the case could occur in which a safety distance between the subject vehicle and the object ahead is maintained for the calculated values at the point in time of being at rest, but a collision (or falling below the minimum distance) occurs because of the actual previous dynamics of the subject vehicle. According to the inventive embodiments, the first and second assessment methods are recognized as being ideally complementary. Such collisions can already be detected by means of the equation of motion assessment method. Thus, if the admissibility criterion for the equation of motion assessment method is fulfilled and the equation of motion assessment method can be used, collisions are reliably detected until coming to rest. However, if the equation of motion assessment method cannot be used because of not fulfilling the admissibility criterion, with the second assessment method a false indication can no longer subsequently occur to the effect that, although the safety distance or minimum distance is maintained at the point in time of being at rest, a collision already occurs. Such collisions would have been detected in the equation of motion assessment procedure.

Thus, a reliable method that can be implemented at relatively low computing costs is provided, which reliably detects different initial movement states of the subject vehicle and of the object ahead. Unnecessarily early emergency braking with risks arising therefrom both to the subject vehicle and possibly also to following vehicles are thereby excluded with high reliability.

According to an embodiment of the present invention, both automatic emergency braking can be triggered or even a warning indication signal can be output to the driver. Accurate determination can include response times, which for an automatic emergency brake system include the equipment-related times to fill the brakes and operate the actuators, and also take into account the response time of the driver when outputting a warning indication signal to the driver.

According to an embodiment, various cases are subdivided hierarchically. In principle, a first case can initially check whether the relative distance between the subject vehicle and the object ahead following the response time is less than a minimum distance that is to be maintained; if the first criterion is fulfilled, emergency braking will always be initiated immediately. Only subsequently are e.g., four cases considered, in each of which it is determined whether the first or second assessment method is to be applied. In these cases, the acceleration of the object ahead and the relative speed, especially the relative speed following the response time, are used. Thus, a case distinction can take place on the basis of only two variables, especially in four or five different cases.

In these cases, initially the equation of motion assessment method may be checked and if this is not relevant, then the second assessment method is used. In two other cases, e.g., only the equation of motion assessment method or the second assessment method can be used. Furthermore, a case can exist in which the acceleration of the object ahead is positive and also the difference speed or the relative speed is positive, so that it can be recognized that there is no risk of collision at all.

The control device according to an embodiment of the present invention can cap the torque of the engine, especially depending on the result of the method used to assess whether an emergency braking situation is presented, for which it e.g., outputs control signals to an engine controller.

Still other objects and advantages of the present invention will in pa be obvious and will in part be apparent from the specification.

The present invention accordingly comprises the features of construction, combination of elements, arrangement of parts, and the various steps and the relation of one or more of such steps with respect to each of the others, all as exemplified in the constructions herein set forth, and the scope of the invention will be indicated in the claims.

BRIEF DESCRIPTION OF THE DRAWINGS

The invention is discussed in greater detail below with reference to the accompanying drawings, in which.

Figure 1:
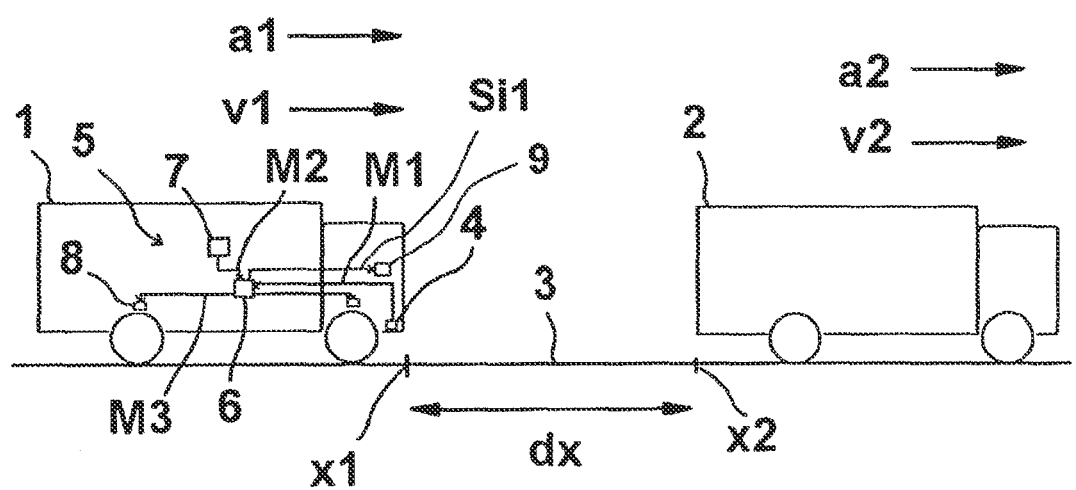
FIG. 1 is a representation of a road scene with two vehicles traveling one after the other.

LIST OF REFERENCE CHARACTERS 1 subject vehicle
2 object/vehicle ahead
3 road
4 distance sensor
5 driving dynamics system
6 control device
7 speed sensor
8 vehicle brakes
9 warning display
S1 apex point of x1
S2 apex point of x2
x1 position of the first vehicle
x2 position of the second vehicle
x1_0 position of the first vehicle at the point in time t=0
x2_0 position of the second vehicle at the point in time t=0
v1 speed of the first vehicle
v1_$t1$ speed of the first vehicle following the response time t1
v2 speed of the second vehicle
a1 longitudinal acceleration of the first vehicle
a2 longitudinal acceleration of the second vehicle
a1_$d$_1 first target acceleration
a1_$d$_2 second target acceleration
dx relative distance
dx_min minimum distance
dx_0 initial relative distance at the point in time t=0
dx_t1 relative distance following the response time t1
dx_2 relative distance according to BV 2
s1_$br$ available braking distance of the first vehicle
s1_react distance covered by the first vehicle during t1
s2_stop braking distance of the second vehicle until coming to rest
dv relative speed
dv_t1 relative speed following the response time t1
M1 relative distance measurement signal
M2 speed measurement signal
M3 brake control signals
Si1 warning indication signal
t time
t1 response time
t1_$dv$ subject braking time of the first vehicle (dv=0; dx=dx_min)
t2_stop object braking time of the second vehicle/object to v2=0
BV1 assessment method 1
BV2 assessment method 2
BV0 advance assessment method
K1 first criterion
K2 further criterion
K2$a$ second criterion
K2$b$ third criterion
K2$c$ fourth criterion
K2$d$ fifth criterion
Zk1 admissibility criterion

DETAILED DESCRIPTION OF THE PREFERRED EMBODIMENTS

Referring now to the drawing figures, FIG. 1 depicts a first subject vehicle 1 driving on a road 3 behind an object ahead 2, in this case a second vehicle 2 ahead. Only movements in the common vehicle longitudinal direction are considered below. The first subject vehicle 1 is located at a position x1 and is traveling at a speed v1 and with an acceleration a1. A braking process thus constitutes an acceleration a1 with a negative value. Accordingly, the second vehicle ahead 2 is at a position x2, traveling at a second speed v2 and with a second acceleration a2. All variables x1, v1, a1; x2, v2, a2 are time dependent. Consequently, second order equations of motion in the time domain are established for the two vehicles, the first subject vehicle 1 and the vehicle ahead 2. Preferably, a constant first subject acceleration and second acceleration a1, a2 are assumed here, at least until the initiation of a braking process of the subject vehicle 1.

The subject vehicle 1 comprises a distance sensor 4 for determining a relative distance dx between the first subject vehicle 1 and the vehicle 2 ahead, a driving dynamics system 5 with a control device 6, a speed sensor 7 and vehicle brakes 8 that can be controlled by the control device 6. The distance sensor 4 outputs a relative distance measurement signal M1 and, correspondingly, the speed sensor 7 outputs a speed measurement signal M2 to the control device 6. The speed sensor 7 can also be formed by the ABS wheel revolution rate sensors. Furthermore, the control device 6 outputs brake control signals M3 to the vehicle brakes 8.

According to an embodiment of the present invention, a case distinction is carried out depending on various criteria in various scenarios, in which different assessment processes or assessment methods are used to determine whether a collision can occur and when emergency braking may have to be initiated.

All calculations take place in the first subject vehicle 1, which thus determines the risk of a rear-end collision with the vehicle ahead 2. Depending on the determination, subsequently either emergency braking is automatically initiated by an autonomous emergency brake system (advanced emergency braking system, AEBS) of the first subject vehicle 1 and/or a warning indication signal Si1 is output by means of a warning display 9 to the driver of the first subject vehicle 1.

For each of the two cases, a different response t1 can be applied. For an independent AEBS, a shorter response time t1 can be applied, which is essentially determined by the time to build up a brake pressure in the brakes (applying air to brakes). For a collision warning (forward collision warning, FCW) to the driver, initially the response time of the driver, e.g., between one second for an attentive driver and two seconds for a distracted or inattentive driver, and additionally the required equipment-related time to build up the internal brake pressure are to be taken into account.

Assessment methods for the braking criterion, i.e., the determination of a point in time at which the emergency braking is to be initiated, are described below.

The aim is to establish, where possible, the second order equations of motion of the first subject vehicle 1 and of the second vehicle ahead 2 and to determine therefrom whether emergency braking is to be initiated. Thus, a path of motion or parabola of motion is established, which in the case of negative acceleration may result in coming to rest, but mathematically also describes in the following time values a reverse movement of the first subject vehicle 1 involved and/or of the second vehicle ahead 2 involved. However, because the negative acceleration resulting from the braking effect ceases when the first subject vehicle 1 and the second vehicle ahead 2 are at rest and does not cause reversing or continued acceleration in the rearward direction (negative direction), a distinction can be made as to whether, when establishing the parabolas of motion or second order equation of motion, the physically meaningless case is detected with a situation possibly falsely indicating a collision (or falling below the minimum distance) during subsequent imaginary reversing. If the case can be excluded, the second order equations of motion in the time domain are established. However, if such a case or a similar case is recognized, a braking distance observation is carried out.

Assessment Method BV1:

The braking criterion can be determined from the second order equations of motion. The position of the second vehicle ahead 2 (object) can be represented as:

$$x2 = x2\_0 + v2 \cdot t + \frac{1}{2} a2 \cdot t^2. \quad \text{Equation 1}$$

where x2_0 is the position at the point in time t=0.

Accordingly, the position of the subject first vehicle 1 can be represented as follows:

$$x1 = x1\_0 + v1 \cdot t + \frac{1}{2} a1 \cdot t^2. \quad \text{Equation 2}$$

Here, x1 relates to the forward end point of the subject first vehicle 1; by contrast x2 relates to the rearward end point, i.e., the rear of the second vehicle 2 ahead, so that the relative distance dx is directly measured by the distance sensor 4. With dx=0 there is thus a collision or a rear-end collision.

From Equations 1 and 2 the relative distance dx can be represented as follows:

$$dx = (x2\_0 - x1\_0) + (v2 - v1) \cdot t + \frac{1}{2} \cdot (a2 - a1) \cdot t^2$$

It follows from this that:

$$dx = dx\_0 + dv \cdot t + \frac{1}{2} \cdot (a2 - a1) \cdot t^2. \quad \text{Equation 3}$$

with dv=v2−v1, i.e., the relative speed, and dx_0=x2_0−x1_0, a relative distance dx_0 determined at the point in time t=0.

This equation thus describes the relative movement between the first subject vehicle 1 and the second vehicle ahead 2. This can be applied in order to avoid a collision between the first subject vehicle 1 and the second vehicle ahead 2 as late as possible.

The acceleration a1 of the subject vehicle 1 (of negative magnitude) is now determined for bringing the relative speed dv to zero while at the same time an admissible minimum distance dx_min is reached, i.e., dx=dx_min. The idea here is that for a relative speed dv=0 an approach by the first subject vehicle 1 to the second vehicle ahead 2, which should take place on reaching the minimum distance dx_min, will no longer occur.

If the two conditions dv=0 and dx=dx_min are inserted in Equation 3, the following value is given as the first target acceleration a1_d_1:

$$a1\_d\_1 = a2 - \frac{dv^2}{2 \cdot (dx\_0 - dx\_min)}. \quad \text{Equation 4}$$

Here, the value a1_d_1 is referred to as the "first" target acceleration and is provided with the extension "_1", because it is determined according to the first assessment method BV1, i.e., the equation of motion assessment method.

In order to calculate the necessary first target acceleration a1_d_1 of the subject vehicle 1, the relative speed following the response time t1 is determined as dv_t1. In the above equations it is thus assumed that the accelerations a1 and a2 are constant between the points in time t=0 and t=t1. The following is thus the result:

$$dv\_t1 = dv + (a2 - a1) \cdot t1 \quad \text{Equation 5.}$$

In addition, the relative distance dx_t1 following the response time t1 is determined for determining the first target acceleration a1_d_1. For this purpose, it is again assumed that the accelerations a1 and a2 are constant. Using the relative distance dx or dx_0 determined at the point in time t=0 by the distance sensor 4, dx_t1 can thus be calculated as follows:

$$dx\_t1 = dx\_0 + dv \cdot t1 + (a2 - a1) \cdot \frac{t1^2}{2}. \quad \text{Equation 6}$$

The required first target acceleration a1_d_1 of the subject vehicle 1 can thus be calculated based on dv_t1 and dx_t1 as follows:

$$a1\_d\_1 = a2 - \frac{(dv\_t1)^2}{2 \cdot (dx\_t1 - dx\_min)}. \quad \text{Equation 7}$$

Figure 2:
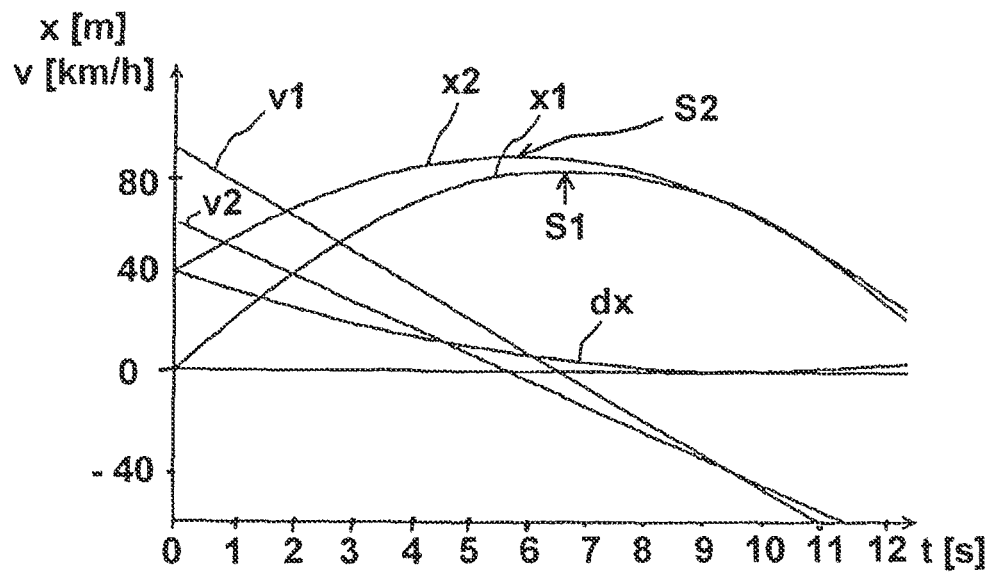
FIGS. 2 to 7 are diagrams illustrating the distances and speeds of the two vehicles and their relative distance according to different initial conditions.

Equation 7 is used to calculate the required first target acceleration a1_d_1 in the following example. In the example, the second vehicle ahead 2 is accelerating with a second acceleration a2=−3 m/s$^2$, i.e., the second vehicle 2 ahead is braking from a second initial speed v2=60 km/h. The subject first vehicle 1 has an initial speed of v1=90 km/h. The minimum distance dx_min is set to 1 m, the relative distance dx_t0 at the point in time t=0 between the first subject vehicle 1 and the second vehicle ahead 2 is determined by the distance sensor 4 at dx_0=60 m. With a response time t1=1 s the example results by means of Equation 7 in a required first target acceleration of a1_d_1=−4.3 m/s². The resulting curves of motion of the first subject vehicle 1 and of the second vehicle ahead 2 are shown in FIG. 2.

The speed curves of the first speed v1 and of the second speed v2 thus decrease linearly and reach the zero line. The displacement curves x1 and x2 form parabolas that are open below, which initially rise up to their respective apex points S1 or S2, at which v1 or v2 thus also equal 0; the right side of the parabolas is assessed as physically meaningless because it corresponds to an imaginary reversing movement in each case.

With the selected example, a stationary state of the second vehicle ahead 2 is achieved after t=5.5 s, i.e. v2 (t=5.5 s)=0. The subject vehicle 1 reaches the stationary state v1=0 at t=6.8 s.

With this example the inadmissible region in the diagram, i.e., the imaginary reversing movement of the second vehicle ahead 2, thus starts from t=5.5 s.

In the example of FIG. 2, the point at which the conditions dv=0 and dx=dx_min are fulfilled is arranged at t=9.7 s when the two lines of v1 and v2 intersect. However, the imaginary point of intersection already lies in the inadmissible region, wherein both vehicle speeds are actually negative at v1=v2=−44.8 km/h, i.e., each is an imaginary reversing movement. The result is thus assessed as inadmissible.

A comparison of the apex points S1 and S2, i.e., the positions x1 (v1=0)=94.8 m and x2 (v2=0)=107.1 m, shows however that with the result for a1_d_1 in the situation a collision would have been avoided. The relative distance dx between the two vehicles 1 and 2 at the point in time of being stationary is, at 107.1 m−94.8 m=12.3 m, greater than the presumed minimum value dx_min, from which it follows that the braking or acceleration at a1_d_1 was too high, i.e., represents a braking effect that is too high. Thus, an autonomous brake system would be activated prematurely.

Figure 3:
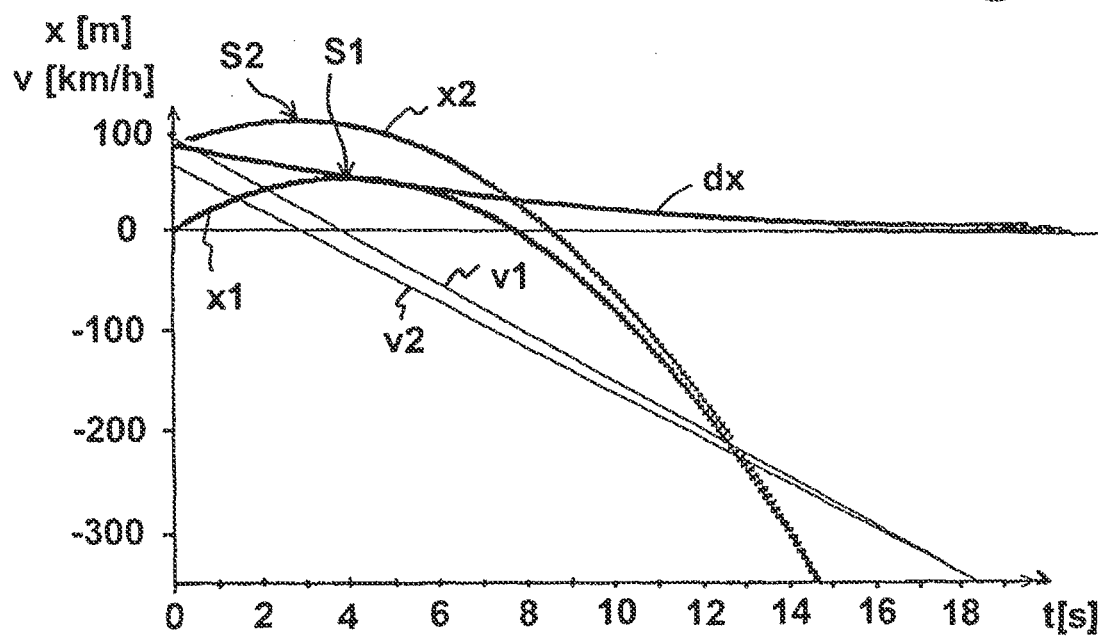

The weakness of the first method or first approach is especially shown in situations in which, e.g., initially, i.e., at t=0, there is a large relative distance dx between the first subject vehicle 1 and the second vehicle ahead 2 and strong braking of the vehicle ahead 2; in such situations the imaginary reversing movement of the vehicle ahead 2 and the subsequent imaginary collision thus occur faster during a reversing movement of the vehicle ahead 2. In FIG. 3, a situation that is modified compared to FIG. 2 is shown; with respect to FIG. 2, the speeds v2=60 km/h, v1=90 km/h at the point in time t=0 and the minimum distance dx_min=1 m are held constant. But now the vehicle ahead 2 is accelerating with a2=−6 m/s², i.e., stronger braking, and the initial relative distance dx_0 between vehicle 1 and 2 is dx_0=90 m. In this case, Equation 7 results in a first target acceleration a1_d_1 of −73 m/s². The curves of motion are shown in FIG. 3.

In the example of FIG. 3, a comparison of the positions of the vehicles at their apex points S1 and S2, i.e., x1 (v1=0)=68.9 m and x2 (v2=0)=114 m shows that the relative distance dx between them when at rest is 45.1 m. The point at which the conditions dv=0 and dx=dx_min are fulfilled also lies within the inadmissible region after the second vehicle ahead 2 has come to rest, i.e., at t=11.8 s, v2=195 km/h, similar to the above example of FIG. 2.

The approach using second order equations of motion in the time domain with the boundary conditions to achieve a relative speed dv=0 (equal speeds of the vehicles) by means of the braking while simultaneously setting a minimum distance dx_min is thus not used or is rejected for such cases.

Figure 4:
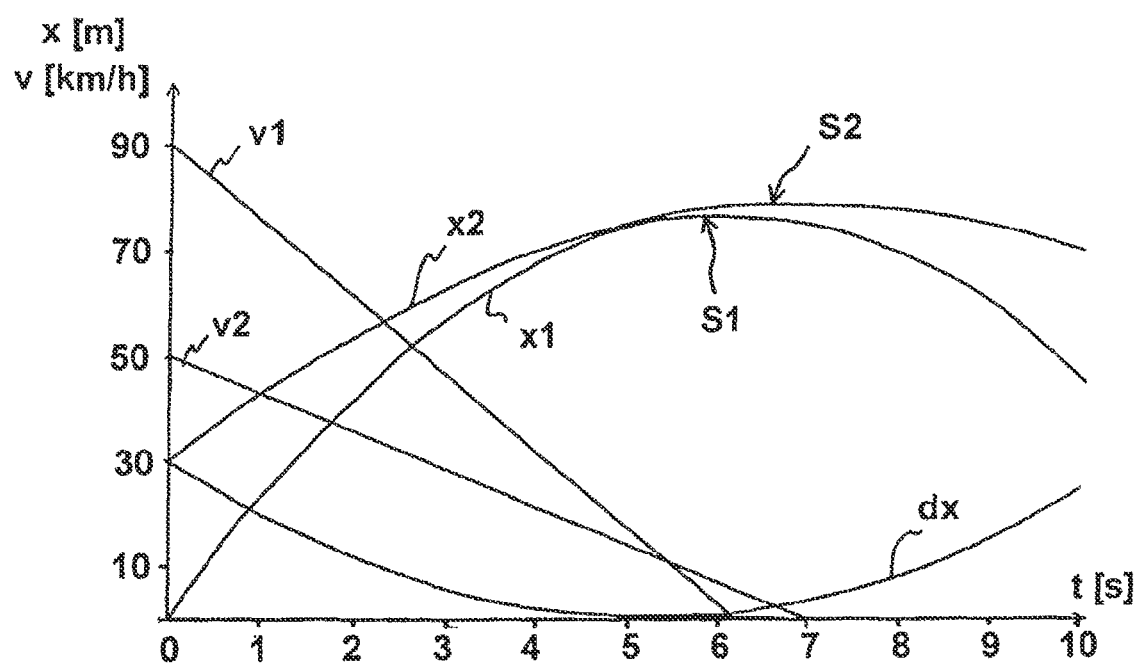

In FIG. 4, another example is shown in which the conditions dv=0 and dx=dx_min are achieved before the vehicle ahead 2 comes to rest. The vehicle ahead 2 is braking with a2=−2 m/s² from an initial second speed of v2=50 km/h. The subject vehicle 1 has an initial speed of v1=90 km/h. The value for dx_min is set to 1 m, and the initial relative distance dx_0 between the two vehicles 1, 2 is dx_0=40 m. The response time is again t1=1 s. For the example, Equation 7 results in a value a1_d_1 of −5.2 m/s². The resulting movements are shown in FIG. 4. The vehicle ahead 2 comes to rest after t=7 sec. The conditions dv=0 and dx=dx_min are fulfilled at t=5.1 s. In the situation, the result represents a point in time that lies within the allowed region; Equations 3 and 4 represent realistic movements of both vehicles 1, 2 with v1, v2>0. In the situation of FIG. 4, the value a1_d_1, which is calculated on the basis of Equation 7, thus represents an admissible value that can be used for assessing the situation.

Thus, it can be recognized that Equation 7 produces admissible values while both vehicles 1, 2 are still traveling, i.e., have not yet reached the stationary state. However, the results are inadmissible if one of the vehicles 1, 2 comes to rest.

As graphically illustrated in the drawing figures, an inadmissible region thus starts if the paraboloid distance curve x1 or x2 of one of the vehicles 1, 2 reaches its apex point S1 or S2; accordingly, the speed lines then each intersect the zero point or the zero axis.

An admissibility criterion Zk1 is therefore applied in order to check the admissibility of the first assessment method. For this purpose, the subject braking time t1_dv that the subject vehicle 1 requires to reach the conditions dv=0 and dx=dx_min is compared with the object braking time t2_stop that the second vehicle ahead 2 requires for braking to rest. If the admissibility criterion Zk1: t1_dv≤t2_stop is fulfilled, it is ensured that the situation is to be assessed according to FIG. 4, i.e., the subject vehicle 1 reaches dv=0 and dx=dx_min before the vehicle ahead 2 comes to rest. An admissible result is thus indicated by this, i.e., the equation of motion assessment method (first assessment method) is admissible.

The object braking time t2_stop can be calculated on the basis of its current second speed v2 and second acceleration a2:

$$t2\_stop = \frac{(0 \text{ km/h} - v2)}{a2} = -\frac{v2}{a2}. \quad \text{Equation 8}$$

The subject braking time t1_dv required by the subject vehicle 1 is based on the result for a1_d_1 from Equation 7 and can be calculated as:

$$t1\_dv = \sqrt{\frac{2(dx\_t1 - dx\_min)}{(a2 - a1\_d\_1)}} + t1. \quad \text{Equation 9}$$

This gives the following assessment criteria for the admissibility or validity:

If the admissibility criterion a1 is fulfilled, i.e., t1_dv≤t2_stop, then the first target acceleration a1_d_1 applies or is admissible, i.e., the equation of motion assessment method (first assessment method) BV1 with Equation 7 is admissible.

If t1_$dv$>t2_stop, then a1_$d$_1 is not admissible.

In order to be able to suitably recognize the inadmissible situations, in which the determination described above does not lead to an admissible result, and to determine a second, in this case admissible, target acceleration or required deceleration a1_$d$_2, the subsequent second assessment process BV2 or assessment method is applied:

Second Assessment Process BV2:

The second assessment process BV2 calculates the distance that the subject vehicle 1 has available to come to rest behind the vehicle ahead 2.

Based on the distance, the second target acceleration a1_$d$_2 is calculated that is required to come to rest within the distance, starting from the current speed v1 of the subject vehicle 1. The calculation involves all parts that contribute thereto. The parts or partial distances are:

the current distance dx between the subject vehicle 1 and the vehicle ahead 2, the distance s2_stop that the vehicle ahead 2 travels until coming to rest during the braking process with its current second acceleration a2 (braking) from its current second speed v2, the distance s1_react, that the subject vehicle travels during the response time t1, the minimum distance dx_min that should remain between the vehicles 1 and 2 after both have come to rest.

The maximum available braking distance s1_br for the subject vehicle 1 can be calculated according to:

$$s1\_br = dx + s2\_stop - s1\_react - dx\_min, \quad \text{Equation 10}$$

with $$s2\_stop = -\frac{v2^2}{2 \cdot a2}. \quad \text{Equation 11}$$

$$s1\_react = v1 \cdot t1 + \frac{1}{2} \cdot a1 \cdot t1^2. \quad \text{Equation 12}$$

In order to calculate the required second target acceleration a1_$d$_2 of the subject vehicle 1, first the speed v1_$t$1 of the subject vehicle 1 following the response time t1 is determined. This takes place under the assumption that the subject vehicle 1 is traveling with a constant acceleration a1 during the response time t1:

$$v1\_t1 = v1 + a1 \cdot t1 \quad \text{Equation 13.}$$

Equation 13 thus gives the speed of the subject vehicle 1 following the response time t1. Based on v1_$t$1 and s1_br, the required acceleration of the subject vehicle 1 can be determined as a second target acceleration a1_$d$_2 by:

$$a1\_d\_2 = -\frac{(v1\_t1)^2}{2 \cdot s1\_br}. \quad \text{Equation 14}$$

Figure 5:
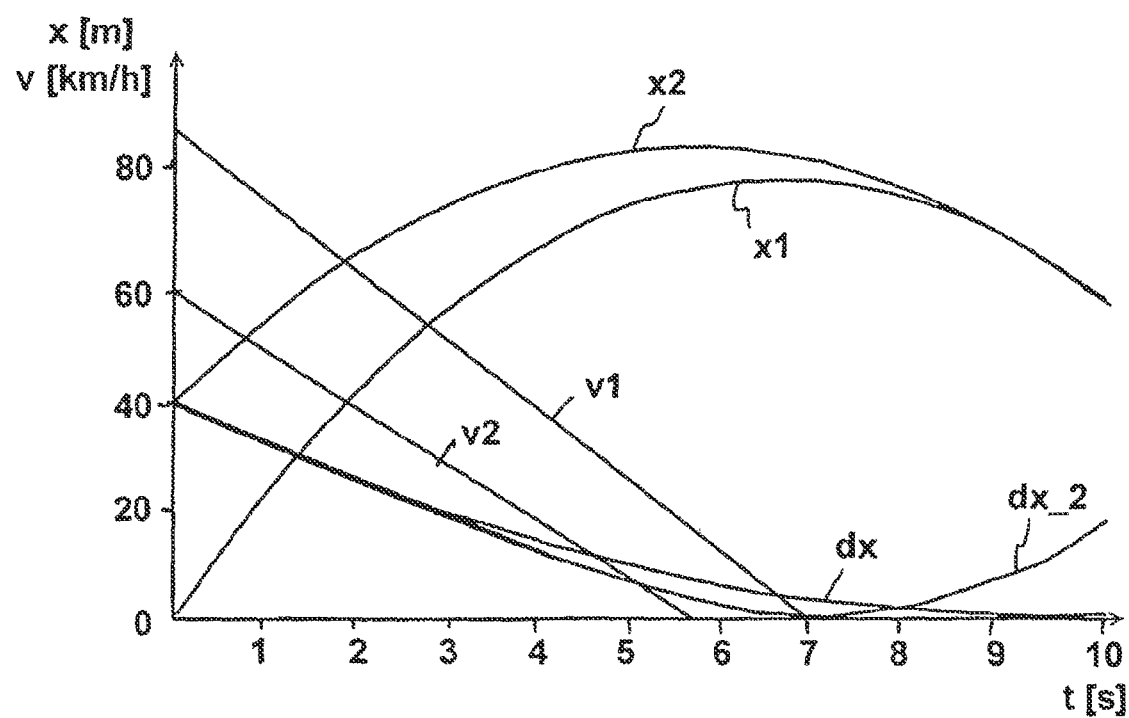

The second target acceleration a1_$d$_2 that is determined in Equation 14 thus represents the required deceleration of the second assessment method BV2 and is used in the following example. The driving situation of this example is similar to example 1 of FIG. 2 in order to enable a direct comparison of the two approaches to calculating the target acceleration or required deceleration. The vehicle ahead 2 is accelerating (braking) at a2=−3 m/s$^2$ from an initial second speed of v2=60 km/h. The subject vehicle 1 has an initial speed of v1=90 km/h. The value for dx_min is set to 1 m and the initial relative distance dx_0 between the two vehicles 1 and 2 is dx_0=60 m. The response time t1 is 1 s. The second assessment method BV2 according to Equation 14 leads to a required deceleration (second target acceleration) a1_$d$_2 of −3.9 m/s$^2$. However, the equation of motion assessment method BV1 according to Equation 7 leads to a value of the first target acceleration of a1_$d$_1 of −4.3 m/s$^2$, which is to be considered as described above to be an inadmissible result, because Equation 7 represents a result whose point in time is after the first subject vehicle 1 and the second vehicle ahead 2 come to rest, at which the first subject vehicle 1 and the second vehicle ahead 2 are traveling backwards. In FIG. 5, the relationships are represented by the curves or graphs already shown in FIG. 2 and the other curves.

The second assessment method BV2 thus only takes into account the end points of the situation if the first subject vehicle 1 and the second vehicle ahead 2 have come to rest; the braking phases are not considered separately for the first subject vehicle 1 and the vehicle ahead 2. The braking distance s2_stop of the vehicle ahead 2 is used for the calculation of s1_br. By explicit calculation of this value, the unwanted consideration of the reversing movement of the vehicle ahead 2 is avoided. With this approach a stationary state of the second vehicle 2 ahead following the braking process is thus considered. This is illustrated by curve x2 in FIG. 5. It represents the stationary state or the fixed position. In FIG. 5 x2=const and v2=0 apply here after the second vehicle 2 ahead has come to rest. It is possible to calculate a correct target acceleration in such situations in which the subject vehicle 1 comes to rest after the vehicle ahead 2 comes to rest.

The curves in FIG. 5 thus show that Equation 14 represents the correct value for the target acceleration in this situation because it represents exactly the acceleration that is required in order to avoid a collision with the vehicle ahead 2 and for the first subject vehicle 1 to come to rest at a distance of 1 in behind the vehicle ahead 2. Any stronger braking would also prevent a collision with the vehicle ahead 2, but coming to rest would occur too early, i.e., at a larger relative distance dx than the target value of dx_min=1 m. This could thus lead to premature activation of the brake system with an AEBS.

Figure 6:
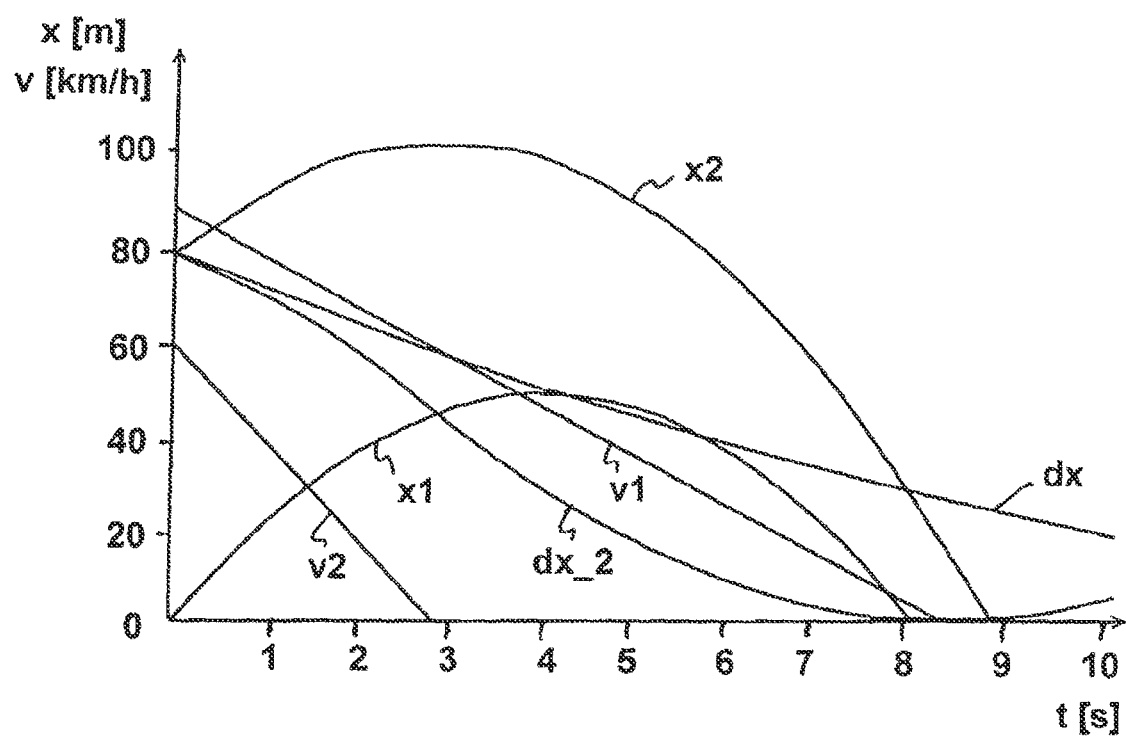

The second example of the previously shown equation of motion assessment method BV1 shows another situation in which the equation of motion assessment method BV1 results in too high a value for the first target acceleration a1_$d$_1. These situations are generally characterized by a large relative distance dx between the first subject vehicle 1 and the second vehicle ahead 2 and a strong deceleration a2 of the vehicle ahead 2. The example described with reference to FIG. 3 uses an initial second speed v2=60 km/h of the vehicle ahead 2, an initial speed v1=90 km/h of the subject vehicle 1, a minimum distance dx_min=1 m, a second acceleration a2_$d$_2=−6 m/s$^2$ of the vehicle ahead 2 and an initial relative distance dx_$0$=90 m. In this example, Equation 7 results in a first target acceleration of a1_$d$_1 of −7.3 m/s$^2$. However, Equation 14 results in a second target acceleration of a1_$d$_2=−3.6 m/s$^2$ in this situation. The resulting movements according to the two deceleration values are shown in FIG. 6.

The vehicle ahead 2 comes to rest at t=2.8 s. The value for a1_$d$_2 according to the equation of motion assessment method BV1 described above is too high and leads to a distance at rest of 45.1 m, as indicated above. However, the second assessment method BV2 leads to a value of the second target acceleration a1_d_2 of −3.6 m/s², which corresponds to the minimum deceleration that is necessary to prevent the collision with the vehicle ahead 2 in this situation. FIG. 6 shows that the subject vehicle 1 comes to rest at t=8 s and achieves a relative distance of 1 m.

By contrast, the example 3 shown above in connection with the equation of motion assessment method BV1 provides a correct result for the first target acceleration a1_d_1 with the equation of motion assessment method BV1. Here, the vehicle ahead 2 has decelerated with a2=−2 m/s² for an initial speed of 50 km/h. The subject vehicle 1 has an initial speed of 90 km/h. The value for dx_min is set to 1 m and the initial relative distance dx_0 between the first subject vehicle 1 and the second vehicle ahead 2 is 40 m. In this example, Equation 7 leads to a first target acceleration of a1_d_1=5.2 m/s². Equation 14, however, leads to a result of a1_d_2=−5.02 m/s² for this situation. The resulting movements for the two acceleration values are shown in FIG. 7.

Figure 7:
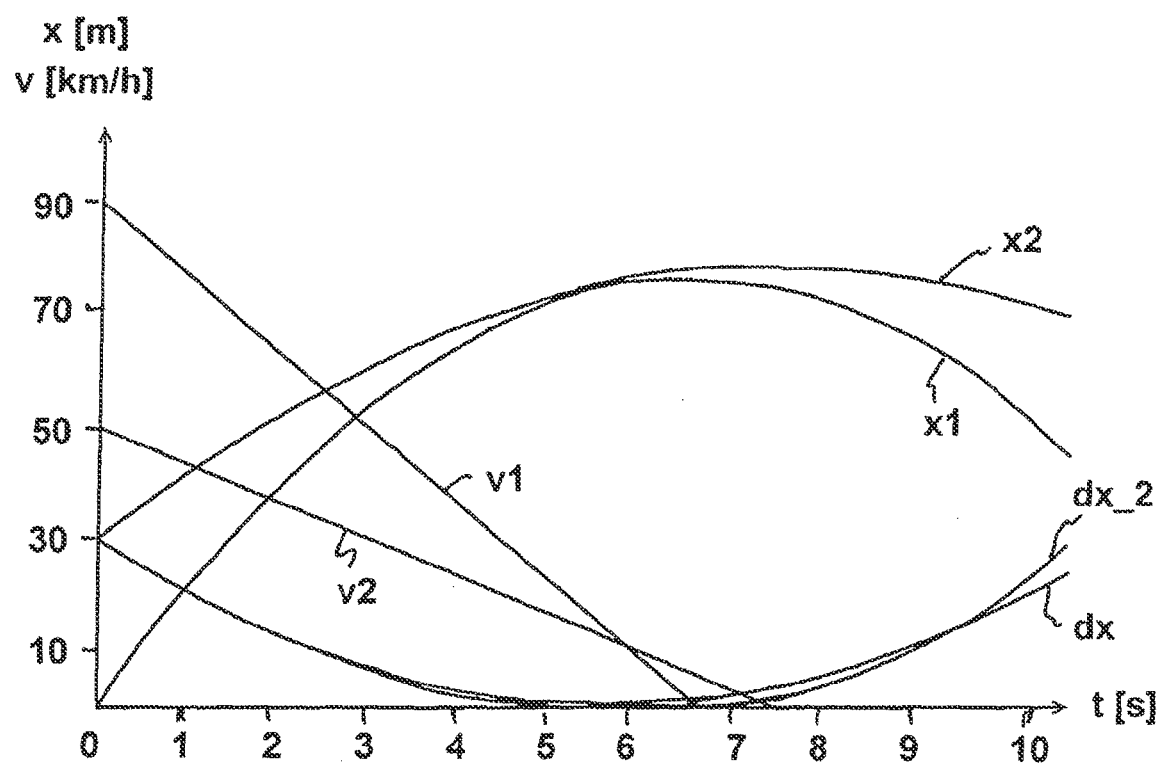

FIG. 7 shows that deceleration with the second target acceleration a1_d_2 determined according to the second assessment method BV2 leads to the subject vehicle 1 coming to rest at t=6 s. The distance covered by the subject vehicle 1, which is shown as x1, is 1 m smaller than the position x2 of the vehicle ahead 2 if the vehicle ahead 2 comes to rest after t=7 s. However, before the subject vehicle 1 comes to rest for a second target acceleration a1_d_2 the relative distance dx_2 between the subject first vehicle 1 and the second vehicle 2 ahead determined by the second assessment method BV2 is less than 0. This means that the subject vehicle 1 collides with the vehicle ahead 2 before the subject vehicle 1 and the vehicle ahead 2 come to rest. Thus, the value of the second assessment method BV2 for the second target acceleration a1_d_2 in this example is not correct, or does not lead to a correct calculation of the deceleration value in order to prevent a collision with the vehicle ahead 2. Rather, in such a case the equation of motion assessment method BV1, i.e., a1_d_1 according to Equation 7, is to be used.

The second assessment method BV2 thus only considers the end points of the braking situation if both vehicles 1, 2 have come to rest. However, it does not check the possible crossing point of the paths of motion of the two vehicles 1, 2 during the braking process, i.e., collisions taking place in the meantime.

Thus, both assessment methods BV1, BV2 are used for correct calculation of the braking criterion.

For the specific case in which the vehicle ahead 2 is at rest and the subject vehicle 1 is approaching, both assessment methods BV1, BV2 lead to the same result, because $-dv\_t1=v1\_t1,$ $dx\_t1-dx\_min=s1\_br$ $a2=0$ Consequently, taking into account the above explanations, various cases for the use of the assessment methods BV1 and BV2 are thus different, essentially depending on the acceleration a2 of the vehicle ahead 2 and the relative speed between the vehicles 1 and 2 after the response time dv_t1 has elapsed.

For checking the necessity for automatic brake operation for collision avoidance, the following cases are checked:

In a first criterion K1, a check is made as to whether the distance dx_t1 between the vehicles 1 and 2 after the response time t1 is smaller than the minimum distance dx_min: dx_t1<dx_min.

If the first criterion K1 is fulfilled, there is a need for automatic braking because the driver is unable to independently initiate deceleration.

If the first criterion K1 is not applicable, in another criterion K2, four cases are distinguished and checked: K2a, K2b, K2c, K2d. For case distinction, in each case the accelerations a2 of the vehicle ahead 2 and the relative speed after expiry of the response time dv_t1 are used.

The second criterion K2a is checked if a2<0 and dv_t1<0. Here, the equation of motion assessment method BV1 is first checked. If this is not applicable, the second assessment method BV2 is used.

If the second criterion K2a is fulfilled, i.e., the determined target acceleration a1_d_1 or a_1_d2 is below a limit value, there is a need for automatic braking of the subject vehicle 1 because the driver is not able to independently set the necessary level of deceleration after his/her response time has elapsed.

The third criterion K2b is checked if a2<0 and dv_t1≥0. This is always checked using the second assessment method BV2. This avoids the weakness of the equation of motion assessment method BV1 in those situations in which there is high deceleration of the vehicle ahead 2. If the third criterion K2b is fulfilled, i.e., the determined second target acceleration a1_d_2 exceeds a limit value, there is a need for automatic braking of the subject vehicle 1 because the driver is not able to independently set the necessary level of deceleration after his/her response time has elapsed.

The fourth criterion K2c is checked if a2≥0 and dv_t1<0. This is only checked using the equation of motion assessment method BV1 because only the assessment method BV1 is relevant. The second assessment method BV2 cannot be used here because no braking distance s2_stop can be determined for positive acceleration a2 of the vehicle ahead 2. The weakness of the equation of motion assessment method BV1 in situations characterized by high deceleration of the vehicle ahead 2 is not relevant in such situations, because only positive values for a2 are considered. If the fourth criterion K2c is fulfilled, i.e., the determined first target acceleration a1_d_1 exceeds a limit value, there is a need for automatic braking of the subject vehicle 1 because the driver is not able to independently set the necessary level of deceleration after his/her response time has elapsed.

The fifth criterion K2d is checked if a a2≥0 and dv_t1≥0. Here, the vehicle ahead 2 is accelerating away from the subject vehicle 1. This case is thus completely safe, so that there is no need to initiate automatic emergency braking.

The term "first, . . . fifth criterion" does not express any order or value here.

Thus, according to the criteria K1, K2a to K2d, a control algorithm can be formed, according to which initially the first criterion K1 is checked and subsequently the case distinction takes place in criteria K2a, K2b, K2c and K2d, in which as described the target acceleration (required deceleration) is determined either according to Equation 7 as a1_d_1 or according to Equation 14 as a2_d_2.

It will thus be seen that the objects set forth above, among those made apparent from the preceding description, are efficiently attained, and since certain changes may be made without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described and all statements of the scope of the invention that, as a matter of language, might be said to fall therebetween.

What is claimed is:

1. A method for determining an emergency braking situation of a vehicle, the method of comprising:
    determining state variables including at least two of (i) a speed of a first vehicle, (ii) a longitudinal acceleration of the first vehicle, (iii) a relative distance between the first vehicle and an object ahead, (iv) a speed of the object ahead, and (v) an acceleration of the object ahead; and
    using at least one control unit to: automatically determine, as a function of at least one of the determined state variables, to use one of at least two different methods to assess whether an emergency braking situation exists for the first vehicle, the at least two different methods including (a) an equation of motion assessment method by which an equation of motion system of the first vehicle and of the object ahead is determined and (b) a braking distance assessment method by which a braking distance of the first vehicle is determined; effect the one of the at least two different methods to assess whether an emergency braking situation exists for the first vehicle; and at least one of effect an emergency braking process and output a warning signal when an emergency braking situation exists based on a result of the assessment.

2. The method as claimed in claim 1, wherein using the at least one control unit to determine to use the one of the at least two different methods includes using an admissibility criterion based on a comparison between (i) a first vehicle braking time required by the first vehicle to reach a minimum distance from the object ahead and reach the speed of the object ahead and (ii) an object braking time required by the object ahead to brake to rest.

3. The method as claimed in claim 2, wherein when the first vehicle braking time required by the first vehicle to reach a minimum distance from the object ahead and reach the speed of the object ahead is one of less than and equal to the object braking time required by the object ahead to brake to rest, using the at least one control unit to determine to use the one of the at least two different methods includes determining that the equation of motion assessment method is admissible and effecting the one of the at least two different methods includes using the equation of motion assessment method, and when the first vehicle braking time exceeds the object braking time, using the at least one control unit to determine to use the one of the at least two different methods includes determining that the braking distance assessment method is admissible and effecting the one of the at least two methods includes using the braking distance assessment method.

4. The method as claimed in claim 1, wherein using the at least one control unit to determine to use the one of the at least two different methods is effected based on a function of at least one of a response time of an internal brake system of the vehicle after initiation of automatic emergency braking and a driver response time after output of a warning indication signal via a warning display.

5. The method as claimed in claim 4, further comprising using the at least one control unit to effect an advance assessment method to assess whether an emergency braking situation exists for the first vehicle on the basis of whether a first criterion is fulfilled, the first criterion being whether the relative distance between the first vehicle and the object ahead following the at least one of the response time of the internal brake system of the vehicle and the driver response time is less than a minimum distance from the object ahead that is to be maintained, wherein when the first criterion is fulfilled, recognizing an emergency braking situation, and wherein using the at least one control unit to determine to use the one of the at least two different methods is effected when the first criterion is not fulfilled.

6. The method as claimed in claim 5, further comprising, when the first criterion is not fulfilled, using the at least one control unit to effect an assessment as to whether an emergency braking situation exists for the first vehicle on the basis of the acceleration of the object ahead and a relative speed of the object ahead with respect to the speed of the first vehicle following the at least one of the response time of the internal brake system of the vehicle and the driver response time, wherein the relative speed following the at least one of the response time of the internal brake system of the vehicle and the driver response time is the difference between the speed of the object ahead and the speed of the first vehicle.

7. The method as claimed in claim 5, further comprising, when the first criterion is not fulfilled using the at least one control unit to determine to use the one of the at least two different methods effected based on at least one of: (i) a second criterion that is fulfilled when the acceleration of the object ahead is negative and a relative speed of the object ahead with respect to the speed of the first vehicle following the at least one of the response time of the internal brake system of the vehicle and the driver response time is negative, wherein when the second criterion is fulfilled, using the at least one control unit to check an admissibility criterion for the equation of motion assessment method, and when the admissibility criterion for the equation of motion assessment method is fulfilled, using the at least one control unit to effect the equation of motion assessment method, and when the admissibility criterion for the equation of motion assessment method is fulfilled, using the at least one control unit to effect the braking distance assessment method; (ii) a third criterion that is fulfilled when the acceleration of the object ahead is negative and the relative speed of the object ahead following the at least one of the response time of the internal brake system of the vehicle and the driver response time is one of greater than and equal to zero, wherein when the this criterion is fulfilled, using the at least one control unit to effect the braking distance assessment method; (iii) a fourth criterion that is fulfilled when the acceleration of the object ahead is one of greater than and equal to zero and the relative speed of the object ahead following the at least one of the response time of the internal brake system of the vehicle and the driver response time is negative, wherein when the fourth criterion is fulfilled, using the at least one control unit to effect the equation of motion assessment method; and (iv) a fifth criterion that is fulfilled when the acceleration of the object ahead is one of greater than and equal to zero and the relative speed of the object ahead following the at least one of the response time of the internal brake system of the vehicle and the driver response time is one of greater than and equal to zero, wherein when the fifth criterion is fulfilled, not effecting a determination of an emergency braking situation.

8. The method as claimed in claim 1, further comprising determining a target acceleration for each of the at least two different methods for assessing whether an emergency braking situation exists.

9. The method as claimed in claim 1, wherein the equation of motion assessment method includes: establishing second order equations of motion in a time domain of the first vehicle and of the object ahead, the second order equations including the relative distance between the first vehicle and the object ahead, the acceleration of the first vehicle and of the object ahead, and the speeds of the first vehicle and of the object ahead; and determining whether the distance between the first vehicle and the object ahead is less than a minimum distance.

10. The method as claimed in claim 9, wherein the equation of motion assessment method includes determining a first target acceleration according to the $$a1\_d\_1 = a2 - \frac{(dv\_t1)^2}{2 \cdot (dx\_t1 - dx\_min)}$$

where $a1\_d\_1$ is the first target acceleration, a2 is the acceleration of the object ahead, dv_t1 is the relative speed of the object ahead following the at least one of the response time of the internal brake system of the vehicle and the driver response time, dx_t1 is the relative distance following the at least one of the response time of the internal brake system of the vehicle and the driver response time, and dx_min is the minimum distance.

11. The method as claimed in claim 1, wherein the braking distance assessment method includes determining a second target acceleration by calculating the braking distance of the first vehicle that remains on initiating braking following the at least one of the response time of the internal brake system of the vehicle and the driver response time based on the speed of the first vehicle, the speed of the object ahead and the acceleration of the object ahead, the relative distance, and a minimum distance from the object ahead.

12. The method as claimed in claim 11, wherein determining the second target acceleration is based on the relationship $$a1\_d\_2 = \frac{(v1\_t1)^2}{2 \cdot s1\_br}$$

where $a1\_d\_2$ is the second target acceleration, v1_t1 is the speed of the first vehicle following the at least one of the response time of the internal brake system of the vehicle and the driver response time, and s1_*br* is the braking distance of the first vehicle available on initiating braking following the at least one of the response time of the internal brake system of the vehicle and the driver response time.

13. A control device for a driving dynamics control system of a vehicle, the control device configured to determine state variables including at least two of (i) a speed of the vehicle, (ii) a longitudinal acceleration of the vehicle, (iii) a relative distance between the vehicle and an object ahead, (iv) a speed of the object ahead, and (v) an acceleration of the object ahead; determine, as a function of at least one of the determined state variables, to use one of at least two different methods to assess whether an emergency braking situation exists for the vehicle; the at least two different methods including (a) an equation of motion assessment method by which an equation of motion system of the first vehicle and of the object ahead is determined and (b) braking distance assessment method by which a braking distance of the first vehicle is determined; and at least one of effect an emergency braking process and output a warning signal when an emergency braking situation exists based on a result of the assessment.

14. A driving dynamics control system comprising a control device, a distance sensor, a speed sensor, and a vehicle brakes, the control device being configured to: determine state variables including at least two of (i) a speed of the vehicle, (ii) a longitudinal acceleration of the vehicle, (iii) a relative distance between the vehicle and an object ahead, (iv) a speed of the object ahead; and (v) an acceleration of the object ahead: and determine, as a function of at least one of the determined state variables, to use one of at least two different methods to assess whether an emergency braking situation exists for the vehicle, the at least two different methods including (a) an equation of motion assessment method by which an equation of motion system of the first vehicle and of the object ahead is determined and (b) a braking distance assessment method by which a braking distance of the first vehicle is determined; and at least one of effect an emergency braking process and output a warning signal when an emergency braking situation exists based on a result of the assessment.

* * * * *